United States Patent [19]
Hoffmann

[11] Patent Number: 4,725,493
[45] Date of Patent: Feb. 16, 1988

[54] CARBON PAPERS CONTAINING CARBON PAPER COMPOSITIONS

[75] Inventor: Dietrich Hoffmann, Roedersheim-Gronau, Fed. Rep. of Germany

[73] Assignee: BASF Aktiengesellschaft, Ludwigshafen, Fed. Rep. of Germany

[21] Appl. No.: 939,001

[22] Filed: Dec. 8, 1986

[51] Int. Cl.[4] .................................................. B32B 3/26
[52] U.S. Cl. ............................... 428/321.5; 282/28 R; 428/484; 428/488.1; 428/914; 503/227
[58] Field of Search ...................... 282/28 R; 346/227; 428/321.5, 484, 488.1, 914

[56] References Cited

U.S. PATENT DOCUMENTS 4,371,634 2/1983 Hoffman et al. .................... 524/275
4,474,898 10/1984 Matsushita et al. ................. 428/914

FOREIGN PATENT DOCUMENTS 12623 6/1980 European Pat. Off. ............ 340/215

*Primary Examiner*—John E. Kittle
*Assistant Examiner*—P. R. Schwartz
*Attorney, Agent, or Firm*—Oblon, Fisher, Spivak, McClelland & Maier

[57] ABSTRACT

Wax compositions and carbon paper compositions based on waxes, oils and colorants contain some or all of the oil in encapsulated form.

9 Claims, No Drawings

CARBON PAPERS CONTAINING CARBON PAPER COMPOSITIONS

The production of wax compositions and carbon paper compositions for copying papers for use once or repeatedly has been known for more than 100 years and has been improved and made cheaper over the years.

However, it has been observed that there has been a decline in the use of carbon paper over the past few years. The reason for this is that the difference in price compared with the capsule papers, which are becoming cheaper and cheaper, is becoming smaller.

For particular intended uses, however, it is impossible to dispense with carbon paper. For example, carbon paper is still used for particularly intense copies and for producing a large number of copies.

Increased use of carbon paper could be achieved by improving the quality and making the carbon paper cheaper.

The copy obtained with carbon paper is produced by a balanced mixture of waxes, oils and colorants. A large number of copies with good intensity is achieved by means of wax inks in a particularly soft formulation, ie. containing a large amount of oils. However, this has an adverse effect on the cleanness of the copies, as a result of unintentional transfer of the composition. Moreover, the oil migrates into the paper and the ink dries.

If the carbon paper ink is made firmer, there is little tendency for the unintentional transfer of the composition but the copying capacity is reduced. Thus, the two measures have opposing effects.

It is an object of the present invention to overcome this dilemma and to improve the conventional wax/carbon paper compositions in order to obtain stable duplicating papers which permit a large number of copies.

We have found that this object is achieved, according to the invention, if some oil of the required oil is added in encapsulated form to the wax compositions and carbon paper compositions based on waxes, oils and colorants.

This has the advantage that the coating is drier and cleaner because of the small amount of free oil, the impression from the paper is more complete than hitherto, the encapsulated oil results in an improvement in the storage properties and the tendency of the oil to migrate is substantially reduced.

Another important advantage is the increase in the number of possible copies, as a rule by up to 100%.

The conventional components, ie. a very wide variety of waxes, oils, colorants and, if required, solvents, are suitable for the preparation of the wax inks:

(a) Waxes:
- paraffin waxes;
- polyethylene waxes;
- carnauba wax;
- vaseline;
- ozocerite;
- wool fat;
- ester waxes;
- beef tallow;
- microcrystalline waxes.

(b) Oils:
- mineral and synthetic oils which contain different amounts of aliphatic, aromatic or naphthenic components and may contain solvents;
- animal and vegetable oils.

(c) Colorants:
- carbon black is preferably used, but other colored pigments, in particular alkali blue grades, may also be employed. Although it is possible to use soluble dyes, for economic reasons this is not usual.

The oil-containing microcapsules can contain all oils conventionally used in wax inks, provided that these oils are suitable for encapsulation. Oil as used in microcapsules for chemical copying papers are also suitable. Microcapsules containing dissolved reactive dyes and other dyes in spray dried form are also very useful for this application.

All capsules which are stable to the components present in the wax compositions and carbon paper compositions can of course be used as microcapsules; such capsules form part of the prior art.

The ratios of the waxes, oils and colorants correspond to those in the conventional mixtures, except that, according to the invention, some or all of the oil is added in encapsulated form. This amount may be from 1 to 100, preferably from 1 to 50, in particular from 5 to 10, % of the total amount of oil.

The compositions according to the invention usually contain

- 10–60 parts of wax
- 10–60 parts of oil, including from 0.6 to 20 parts in encapsulated form and
- 1–30 parts of colorant, and, if required, a solvent.

The carrier is coated by a conventional method.

In the Example which follows, parts and percentages are by weight, unless stated otherwise.

EXAMPLE

A wax ink was produced according to the following formulation:

- 32 parts of carnauba wax,
- 5 parts of ester wax,
- 40 parts of mineral oil,
- 20 parts of carbon black, and
- 3 parts of microcapsule powder containing a mineral oil.

The wax components were added to the initially taken mineral oil, and the mixture was heated until everything had melted. Carbon black was then introduced into the liquid composition and was dispersed. When this operation had been completed, the microcapsule powder was introduced and likewise carefully dispersed. Coating was carried out on a conventional machine, at 4.8 $g/m^2$.

A wax ink composed of

- 35 parts of carnauba wax,
- 5 parts of ester wax,
- 40 parts of mineral oil and
- 20 parts of carbon black served as a comparison.

Coating was carried out on a conventional machine at 8 $g/m^2$.

The following is an overview of the comparison of carbon inks prepared with and without microcapsules:

| | without | with |
|---|---|---|
| | microcapsules | |
| Viscosity of the ink | free-flowing | free-flowing |
| Appearance of the ink | glossy | glossy |
| Processing on the carbon machine | good | good |
| Appearance of the surface of the paper | smooth, glossy | smooth, somewhat |

-continued

| | without | with |
|---|---|---|
| | microcapsules | |
| | | matt |
| Number of copies | 7 | about 15 |
| Shelf life | poor | good |
| Microcapsule content | 0% | 3% |
| Coating weight | 8 g/m$^2$ | 4.8 g/m$^2$ |
| % reflectance of the 3rd copy | 74 | 45 |
| Relative color strength according to DIN 53,234 | 9% | 100% |

I claim:

1. Carbon paper containing a layer of a carbon paper composition based on waxes, oils and carbon black, in which some or all of the oil is present in encapsulated form.

2. Carbon paper as claimed in claim 1, which contains from 1 to 100% by weight of oil in encapsulated form.

3. Carbon paper as claimed in claim 1, which contains from 1 to 50% by weight of the oil in encapsulated form.

4. Carbon paper as claimed in claim 1, which contains from 5 to 10% by weight of the oil in encapsulated form.

5. Carbon paper as claimed in claim 4, wherein the microcapsules contain aromatic, aliphatic or naphthenic oils, or a mixture of these.

6. Carbon paper as claimed in claim 4, wherein the microcapsules contain a mineral oil, kerosene, castor oil, dodecylbenzene, neatsfoot oil, vaseline, low-melting paraffins or a mixture of these.

7. Carbon paper as claimed in claim 1, wherein the microcapsules contain the oils or oil mixtures conventionally used for carbon paper compositions.

8. Carbon paper as claimed in claim 1, wherein the microcapsules contain aromatic, aliphatic or naphthenic oils, or a mixture of these.

9. Carbon paper as claimed in claim 1, wherein the microcapsules contain a mineral oil, kerosene, castor oil, dodecylbenzene, neatsfoot oil, vaseline, low-melting paraffins or a mixture of these.

* * * * *

UNITED STATES PATENT AND TRADEMARK OFFICE

CERTIFICATE OF CORRECTION

PATENT NO. : 4,725,493

DATED : Feb. 16, 1988

INVENTOR(S) : Dietrich Hoffman

It is certified that error appears in the above-identified patent and that said Letters Patent is hereby corrected as shown below:

ON THE TITLE PAGE:

Priority data should be added as follows:

Dec. 14, 1985 [DE] Federal Republic of Germany.....P 3544379.0

Signed and Sealed this

Second Day of August, 1988

*Attest:*

DONALD J. QUIGG

*Attesting Officer*

*Commissioner of Patents and Trademarks*